United States Patent Office 3,553,264
Patented Jan. 5, 1971

3,553,264
NOVEL CARBAMATES OF DICHLOROFORMALDE-HYDE OXIME AND METHODS OF PREPARING AND USING SAME
Roger Williams Addor, Pennington, N.J., assignor to American Cyanamid Company, Stamford, Conn., a corporation of Maine
No Drawing. Filed May 22, 1967, Ser. No. 640,330
Int. Cl. C07c *131/00*
U.S. Cl. 260—566     3 Claims

ABSTRACT OF THE DISCLOSURE

This invention relates to novel dihaloformaldehyde oxime carbamate compositions, a method for the preparation thereof, and has as its principal object the control of undesirable plant species therewith. More particularly, the invention relates to compounds and a method for the preparation of compounds of the formula:

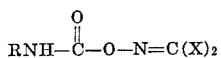

wherein R represents lower alkyl, phenyl, halophenyl, (lower)alkyl-substituted phenyl or (lower)alkoxy-substituted phenyl, and X is a halogen atom, such as chlorine or bromine.

---

It has been found that these compounds are useful as selective postemergence herbicides and may be applied to the foliage of plants in solid or liquid formulations as dusts, dust concentrates, emulsions, dispersions, organic solutions, and the like. They are also useful as intermediates in the preparation of highly effective insecticides.

Unexpectedly, the compounds of the invention may be prepared in a straightforward manner, although it is known that phosgene oxime reacts with amines to form furoxans, indicating that amines tend to destroy the oxime function. See Berichte, vol. 83, page 400 (1950). Notwithstanding the latter, the overall process involves the reaction of about one mole of a suitable oxime with at least one mole and, preferably up to about a 50% mole excess, of an alkyl or an aryl isocyanate in the presence of a tertiary amine catalyst, such as triethylamine, triethylenediamine, pyridine or pentamethylguanidine. With respect to the amount of amine employed, usually about 1% to 10%, by weight, of the amine, based on the oxime employed, is required so as to obtain the dihaloformaldehyde oxime carbamate in good yield. The reaction is advantageously conducted in the presence of an organic solvent, such as benzene, toluene or xylene, and can be written as follows:

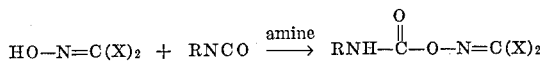

wherein R and X are as defined above.

Illustrative oxime reactants are phosgene oxime or dibromoformaldehyde oxime. Exemplary isocyanate reactants are: methyl isocyanate, ethyl isocyanate, phenyl isocyanate, p-chlorophenyl isocyanate and p-bromophenyl isocyanate.

For a clearer understanding of the invention, the following examples are presented for purposes of illustration. They are not intended to be construed as being limitative thereof. Unless otherwise stated, the parts are by weight.

EXAMPLE 1

Preparation of O-methylcarbamoyl dichloroformaldehyde oxime

To a stirred mixture of 48.5 parts of distilled phosgene oxime and 28.4 parts (by volume) of methyl isocyanate in 150 parts (by volume) of benzene is slowly added ca. 5 parts (by volume) of triethylamine until further addition produced no noticeable exotherm. After two hours, an additional 20 parts (by volume) of methyl isocyanate is added and the mixture stands overnight.

The resultant mixture is concentrated in vacuo and partitioned between 200 parts (by volume) of ether and 25 parts of water. The ether layer is washed with dilute hydrochloric acid, saturated sodium chloride, dried over magnesium sulfate, treated with activated charcoal, and concentrated in vacuo to yield 55.1 grams (76% based on phosgene oxime) of orange oil which crystallizes on seeding and cooling; melting point ca. 25° C. This material, combined with another 19.7 grams of crude product of similar quality in 200 milliliters of ether, is washed with 20 parts (by volume) of 5% potassium hydroxide solution (dark wash) and washing is completed as before. The dry ether solution is brought to the cloud point with 150 milliliters of petroleum ether, cooled to 0° C. and seeded. Further slow cooling to −55° C. yields light yellow crystals which are collected and washed with petroleum ether; 55.1 grams, melting point 31.5° C.–32.5° C.

Purification of phosgene oxime methylcarbamate is also achieved by passing crude product through a film molecular still at 40°–75°/.005 mm. Hg. Under these conditions, phosgene oxime carbamate collects as a colorless solid on the condenser and is removed by subsequent replacement of cold with hot water. Unreacted phosgene oxime collects in the Dry Ice traps. A sample of this material crystallizes from 1:1 ether petroleum ether as fine white crystals, melting point 32.8° C.–33.6° C.

*Analysis.*—Calc'd for $C_3H_4Cl_2N_2O_2$ (percent): C, 21.07; H, 2.36; Cl, 41.47; N, 16.39. Found (percent): C, 21.20; H, 2.40; Cl, 41.69; N, 16.22.

The NMR spectra in deuteroacetone gives signals at 7.11τ (doublet, J=5 c.p.s., $CH_3$) and 3.01τ (broad, N—H) in a ratio of 3:1.

EXAMPLE 2

Preparation of O-ethylcarbamoyl dichloroformaldehyde oxime

Employing the procedure of Example 1 above, a mixture of equimolar amounts of distilled phosgene oxime and ethyl isocyanate in benzene is treated with triethylamine until no further exotherm is observed with the addition of small amounts of the triethylamine. After standing, excess ethyl isocyanate is added to the reaction mixture and the mixture is permitted to stand at room temperature for several hours. The mixture is then concentrated under reduced pressure, partitioned between ether and water, the ether layer is separated from the water and washed with hydrochloric acid followed by saturated sodium chloride, then dried and concentrated under vacuum. O-ethylcarbamoyl dichloroformaldehyde oxime is recovered in good yield.

In similar fashion, O-isopropylcarbamoyl dichloroformaldehyde oxime is prepared employing the above procedure, but substituting isopropyl isocyanate for methyl isocyanate.

EXAMPLE 3

Preparation of O-p-chlorophenylcarbamoyl dichloroformaldehyde oxime

To a stirred mixture of 5.7 parts of phosgene oxime in 10 parts of benzene is added over ten minutes a mixture of 7.4 parts of p-chlorophenyl isocyanate and 0.1 part of triethylamine in 10 parts of benzene. A water bath keeps the exothermic reaction below 45° C. After several hours, 9.3 parts (70%) of off-white crystalline product are collected by filtration. Recrystallization from ether-petroleum ether affords colorless crystals, melting point 145° C.–146° C.

*Analysis.*—Calc'd for $C_8H_5Cl_3N_2O_2$ (percent): C, 35.92; H, 1.88; Cl, 39.77; N, 10.47. Found (percent): C, 36.05; H, 2.00; Cl, 39.93; N, 10.69.

Following the procedure of the above example in every detail but substituting p-methoxyphenyl isocyanate for p-chlorophenyl isocyanate, there is obtained the corresponding O - p - methoxyphenylcarbamoyl dichloroformaldehyde oxime. Similarly, substitution of O-m-(n-butyl) phenyl isocyanate for p-chlorophenyl isocyanate in the above reaction, yields the corresponding O-m-(n-butyl) phenylcarbamoyl dichloroformaldehyde oxime.

QG=Quackgrass
KO=Kochia
LA=Lambsquarters
Mu=Mustard
Pi=Pigweed
Ba=Barnyard grass
Cr=Crabgrass
GF=Green foxtail
WO=Wild oats.

TABLE I

| Compound | Treatment, lb./A. | Herbitoxicity index [1] |||||||||||||
|---|---|---|---|---|---|---|---|---|---|---|---|---|---|---|
| | | Perennial weeds |||||| Annual weeds |||||||
| | | BW | CT | JG | NS | QG | KO | LA | Mu | Pi | Ba | Cr | GF | WO |
| $CH_3NH-\overset{O}{\underset{\|}{C}}-O-N=C\underset{Cl}{\overset{Cl}{<}}$ | 10 | 9 | 9 | m | t | t | m | 9— | 9 | 9 | t | t | t | t |
| | 2 | t | t | t | 0 | t | t | m | 9 | t | t | t | t | t |
| $Cl-\langle\rangle-NH-\overset{O}{\underset{\|}{C}}-O-N=C\underset{Cl}{\overset{Cl}{<}}$ | 10 | 9 | 9 | t | 0 | 0 | 9 | 9 | 9 | 9 | 3 | 3 | t | t |
| | 2 | 0 | 0 | 0 | 0 | 0 | m | s | s | 0 | 3 | 0 | 0 | 0 |

[1] Herbitoxicity index:
9=100% reduction in stand.
9—=1 or 2 stunted plants remaining.
8=85—<100% reduction in stand.
7=70—<85% reduction in stand.
6=60—<70% reduction in stand.
5=50—<60% reduction in stand.
4=40—<50% reduction in stand.
3=30—<40% reduction in stand.
2=20—<30% reduction in stand.
1=10—<20% reduction in stand.
0=no apparent effect.
s=severe injury.
m=moderate injury.
t=trace to slight injury.
—=no test.

EXAMPLE 4

The selective postemergence herbicidal activity of the compounds of the invention is demonstrated by the following tests wherein a variety of healthy seedling monocotyledonous and dicotyledonous plants are treated with aqueous dispersions of test compound. The compounds are made up in a 50/50 acetone/water mixture in sufficient amount to provide the equivalent of 10 pounds of active compound per acre when sprayed on the plants for a predetermined period of time. After spraying, the plants are placed in the greenhouse and cared for until the test is terminated. Two weeks after treatment, the plants are examined and rated according to the Herbitoxicity Index set for below. From the results of the tests, it is apparent that the compounds are highly effective against certain species of dicotyledonous plants but have little effect against the monocotyledonous species.

Abbreviations for plant species in the table below and employed in these herbicidal activity tests are:

BW=Bindweed
CT=Canada thistle
JG=Johnson grass
NS=Nutsedge

What is claimed is:
1. A compound of the formula

$$RNH-\overset{O}{\underset{\|}{C}}-O-N=C(X)_2$$

wherein R represents a member selected from the group consisting of lower alkyl, phenyl, monohalophenyl, lower (monoalkyl)phenyl and lower (monoalkoxy)phenyl, and X is selected from the group consisting of chlorine and bromine.

2. The compound according to claim 1: O-methylcarbamoyl dichloroformaldehyde oxime.

3. The compound according to claim 1: O-p-chlorophenylcarbamoyl dichloroformaldehyde oxime.

References Cited

UNITED STATES PATENTS 3,223,733  12/1965  Heiss et al. _____ 260—566
3,256,330  6/1966  Kilsheimer et al. _____ 260—566

BERNARD HELFIN, Primary Examiner

G. A. SCHWARTZ, Assistant Examiner

U.S. Cl. X.R.

71—121